(12) United States Patent
Basu et al.

(10) Patent No.: US 8,620,888 B2
(45) Date of Patent: Dec. 31, 2013

(54) PARTITIONING IN VIRTUAL COLUMNS

(75) Inventors: Subhransu Basu, Fremont, CA (US); Harmeek Singh Bedi, Redwood Shores, CA (US); Ananth Raghavan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 11/951,933

(22) Filed: Dec. 6, 2007

(65) Prior Publication Data
US 2009/0150336 A1 Jun. 11, 2009

(51) Int. Cl.
*G06F 17/30* (2006.01)

(52) U.S. Cl.
USPC .......................................................... 707/705

(58) Field of Classification Search
USPC .................. 707/1, 5, 705, 717, 687, 803
See application file for complete search history.

(56) References Cited

U.S. PATENT DOCUMENTS

| | | | |
|---|---|---|---|
| 5,584,024 A | 12/1996 | Shwartz | |
| 5,761,653 A | 6/1998 | Schiefer et al. | |
| 5,822,142 A * | 10/1998 | Hicken | 360/53 |
| 5,899,986 A | 5/1999 | Ziauddin | |
| 5,960,428 A | 9/1999 | Lindsay et al. | |
| 5,995,957 A | 11/1999 | Beavin et al. | |
| 6,006,219 A | 12/1999 | Rothschild | |
| 6,029,163 A | 2/2000 | Ziauddin | |
| 6,112,199 A | 8/2000 | Nelson | |
| 6,397,204 B1 | 5/2002 | Liu et al. | |
| 6,477,523 B1 | 11/2002 | Chiang | |
| 6,524,664 B1 * | 2/2003 | Hashimoto et al. | 427/558 |
| 6,609,131 B1 * | 8/2003 | Zait et al. | 1/1 |
| 6,665,684 B2 * | 12/2003 | Zait et al. | 1/1 |
| 6,711,563 B1 * | 3/2004 | Koskas | 707/769 |
| 6,763,358 B2 * | 7/2004 | Anderson et al. | 707/702 |
| 6,820,080 B2 * | 11/2004 | Anderson et al. | 707/702 |
| 6,820,095 B1 * | 11/2004 | Yeung et al. | 707/642 |
| 6,830,785 B1 * | 12/2004 | Hayakawa et al. | 427/553 |
| 6,931,390 B1 * | 8/2005 | Zait et al. | 1/1 |
| 7,143,105 B2 * | 11/2006 | Nakano et al. | 1/1 |
| 7,158,994 B1 * | 1/2007 | Smith et al. | 707/717 |
| 7,158,996 B2 * | 1/2007 | Croisettier et al. | 707/741 |
| 7,171,408 B2 * | 1/2007 | Zuzarte | 1/1 |
| 7,458,066 B2 | 11/2008 | Rhine | |
| 7,693,812 B2 * | 4/2010 | Lim et al. | 707/999.001 |
| 7,702,636 B1 | 4/2010 | Sholtis et al. | |

(Continued)

OTHER PUBLICATIONS

Ian Smith, "Guide to Using SQL: Computed and Automatic Columns", Oracle Rdb Journal—Automatic Columns, Sep. 2008 (originally May 2002), http://www.oracle.com/technetwork/database/rdb/automatic-columns-132042.pdf, 9 pages.

(Continued)

*Primary Examiner* — Sheree Brown
(74) *Attorney, Agent, or Firm* — Hickman Palermo Truong Becker Bingham Wong LLP (57) ABSTRACT

Techniques are described herein for partitioning a database table using a virtual column as the partitioning key. A virtual column is defined by the database to contain results of a defining expression. Partitioning can be performed using a variety of partitioning schemes, such as range partitioning and hash partitioning. The partitions are automatically updated to reflect changes to the values in the base columns upon which the virtual column depends. Partition pruning and parallel-wise partition joins can be performed on database tables which have been partitioned on virtual columns.

14 Claims, 2 Drawing Sheets t1 / 100

| C1 | C2 | C3 |
|---|---|---|
| 1 | 10 | 11 |
| 2 | 20 | 22 |
| 3 | 30 | 33 |
| 4 | 40 | 44 |
| 5 | 50 | 55 |

(56) References Cited

U.S. PATENT DOCUMENTS

| | | | |
|---|---|---|---|
| 7,756,889 B2* | 7/2010 | Yu et al. | 707/774 |
| 7,836,098 B2 | 11/2010 | Baby et al. | |
| 7,870,174 B2* | 1/2011 | Eadon et al. | 707/953 |
| 2001/0016843 A1 | 8/2001 | Olson et al. | |
| 2002/0184207 A1* | 12/2002 | Anderson et al. | 707/4 |
| 2002/0194157 A1* | 12/2002 | Zait et al. | 707/2 |
| 2003/0084025 A1* | 5/2003 | Zuzarte | 707/2 |
| 2003/0149702 A1 | 8/2003 | Saffer et al. | |
| 2006/0206507 A1 | 9/2006 | Dahbour | |
| 2007/0083483 A1 | 4/2007 | Lawande | |
| 2008/0120321 A1* | 5/2008 | Liu et al. | 707/102 |
| 2008/0120322 A1* | 5/2008 | Liu et al. | 707/102 |
| 2008/0172353 A1* | 7/2008 | Lim et al. | 706/47 |
| 2008/0172360 A1* | 7/2008 | Lim et al. | 707/3 |
| 2009/0019077 A1 | 1/2009 | Baby et al. | |
| 2009/0100089 A1* | 4/2009 | Eadon et al. | 707/102 |
| 2009/0150366 A1 | 6/2009 | Basu et al. | |
| 2009/0150413 A1 | 6/2009 | Basu et al. | |
| 2012/0036111 A1 | 2/2012 | Basu et al. | |

OTHER PUBLICATIONS

Horowitz, A Run-Time Execution Model for Referential Integrity Maintenance, published by IEEE, dated 1992, 9 pages.

U.S. Appl. No. 13/278,025, filed Oct. 20, 2011, Final Office Action, mailed Mar. 8, 2013.

U.S. Appl. No. 13/278,025, filed Oct. 20, 2011, Advisory Action, mailed May 28, 2013.

U.S. Appl. No. 13/278,025, filed Oct. 20, 2011, Advisory Action mailed May 28, 2013.

* cited by examiner

PARTITIONING IN VIRTUAL COLUMNS

RELATED APPLICATIONS

The present application is related to U.S. patent application Ser. No. 11/951,918, titled Expression Replacement in Virtual Columns, filed by Subhransu Basu and Harmeek Singh Bedi on Dec. 6, 2007 and U.S. patent application Ser. No. 11/951,890, titled Virtual Columns, filed by Subhransu Basu and Harmeek Singh Bedi on Dec. 6, 2007, the entire contents of which are incorporated herein by reference.

FIELD OF THE INVENTION

The present invention relates to database systems, and in particular, to techniques for representing, manipulating, and using expressions in database systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

In a database management system (DBMS), data is stored in one or more data containers, each container contains records, and the data within each record is organized into one or more fields. In relational DBMSs, the data containers are referred to as tables, the records are referred to as rows, and the fields are referred to as columns.

In a relational DBMS, many operations can be performed on columns in tables. For example, statistics can be gathered on columns. Columns can also be indexed. Furthermore, constraints can be defined on columns in different tables for the purpose of maintaining referential integrity between the tables. Columns are also utilized in performing join predicate push-down operations. Finally, tables can be partitioned on columns, enabling optimizations such as partition-pruning and partition-wise joins.

Data in columns is stored as part of a table in databases, consuming permanent storage resources. To circumvent the need to store some data, a user may choose to compute the data only when it is needed for an operation and discard the data once the operation has completed. This computation of data may be specified within an expression in a query language like SQL. Expressions provide a way to compute data on demand without the need for permanent storage. According to an embodiment, expressions are also processed and optimized in the same manner as columns.

Virtual Columns

An Example

According to one technique, virtual columns may be defined within a DBMS to facilitate the processing and manipulation of computed data. A virtual column is a derived, or computed, column, which may or may not be materialized on a disk. In other words, unlike a regular column, which is stored on a disk as part of a table, a virtual column may be stored for only a short period of time in temporary storage such as volatile memory, and may be discarded at the end of an operation. The values contained in a virtual column are derived by computation of an expression or function and are computed on demand. Virtual columns can be used in queries just like any other regular table columns, providing a simple, elegant, and consistent mechanism for accessing expressions in a SQL statement.

A virtual column is illustrated with the following DDL statement.

create table t1 (c1 number, c2 number, c3 as (c1+c2))

When a DBMS receives and processes this statement, it defines and creates a table t1, where columns c1 and c2 contain values of the number data type. Table t1 also includes a virtual column c3. When a DBMS creates a virtual column, such as c3, in response to receiving a DDL statement such as the one above, the DBMS generates metadata defining the virtual column as containing the results of an expression. A defined virtual column need not contain any physical data. Rather, a virtual column logically contains data values which are based on the results of an expression.

Figure 1:
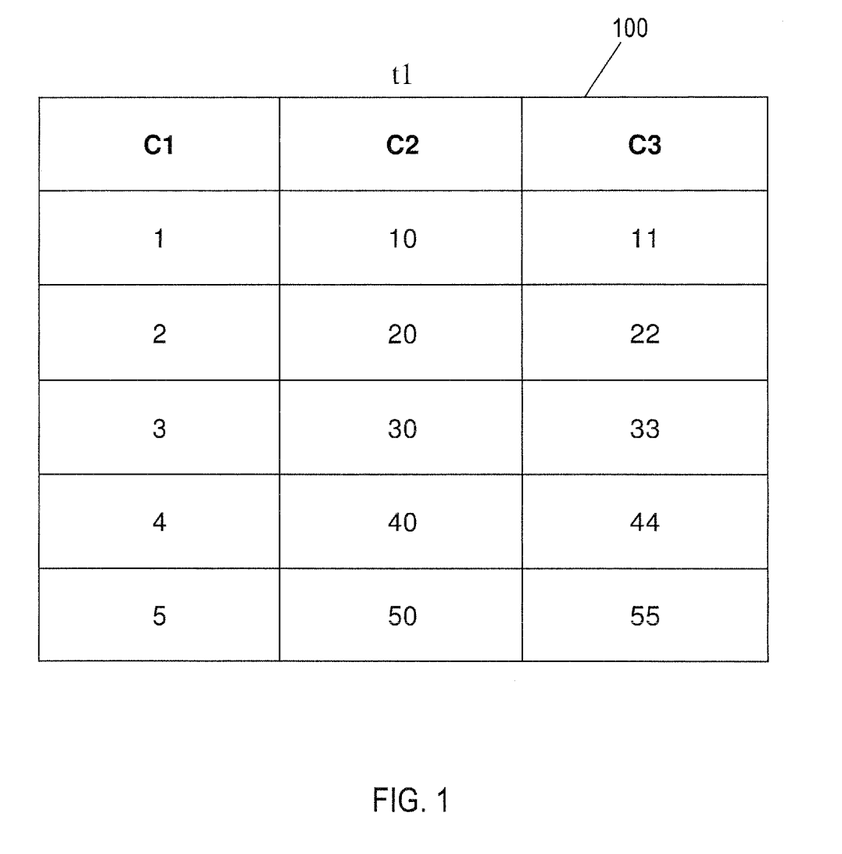
FIG. 1 illustrates an example of a table containing two columns and a virtual column.

Virtual column c3 is derived from the expression "c1+c2", where c1 and c2 are regular columns in table t1. The values in a virtual column conform to the data types in the underlying expression that describes the virtual column. In this case, because c1 and c2 contain values of the number data type, c3 also necessarily contains values of the number data type. Table 100 in FIG. 1 illustrates an example illustrating a table t1 with example values in regular columns c1 and c2 and corresponding computed values in virtual column c3. Table 100 contains five rows. In the first row, for example, column c1 contains the value 1 and column c2 contains the value 10. Therefore, virtual column c3, which contains values that are sums of values in columns c1 and c2, contains the value 11 in the first row. Although virtual column c3 is shown as being in table t1, this is only for the purpose of illustration. Virtual column c3 need not be stored on disk as part of table t1 like regular columns c1 and c2, and often will not be in order to conserve storage resources. When a query statement such as "select c3 of t1" is processed by a DBMS, the values of c3 may be computed dynamically based on values stored in regular columns c1 and c2 at the time of the computation.

Once a virtual column is defined, it may be referenced in SQL queries like a regular column. For example, the following SQL statement uses the virtual column c3 in a select statement.

select * from t1 where c3>30

The above statement selects all rows from the table t1 which contain a value greater than 30 in the c3 column. Again, the values in c3 are not stored on disk, but are computed on demand by a DBMS. Therefore, when a DBMS executes the above statement, the sums of the values in regular columns c1 and c2 are calculated and compared to the value 30 in determining which rows in t1 fulfill the query request.

For simplicity, in the examples in this disclosure, virtual column c3 is described by the expression c1+c2. Significantly, a virtual column may also be derived from SQL functions and user-defined functions in addition to expressions.

Partitioning on Virtual Columns

In relational database tables, rows may be inserted into a table without regard to any type of ordering. Consequently, when a user submits a query that selects data from the table based on criteria for a particular value or range of values, the entire table is scanned to ensure that all rows that satisfy the criteria are identified. Partitioning is a technique that, in certain circumstances, avoids the need to search an entire table (or other database object).

With partitioning, an object such as a database table is divided up into sub-tables, referred to as "partitions". The most common form of partitioning is referred to as range partitioning. With range partitioning, each individual partition corresponds to a particular range of values for one or more columns of the table. For example, one column of a table may store data values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where months equal January, then only the partition associated with the month of January would have to be scanned.

In the example above, the date column acted as the "partitioning key". In other words, the table was partitioned according to the values in the column that served as the partitioning key. According to one technique, users are provided with the ability to designate virtual columns as partitioning keys. Advantageously, this allows users to partition tables not only on the regular columns, but also for expressions. The following is an example of a table which contains information about employees and which contains a virtual column called total compensation.

```
create table employees (
    employee_id number;
    first_name varchar;
    last_name;
    salary number;
    commission_pct;
    total_compensation as (salary * (1 + commission_pct))
)
```

A user may partition the employees table as follows.

```
partition by range (total_compensation) (
    partition p1 values less than (50000),
    partition p2 values less than (100000),
    partition p3 values less than (150000),
    partition p4 values less than (MAXVALUE)
)
```

This example illustrates using a virtual column (total_compensation) as the partitioning key when partitioning a table (employees). To perform this partition, values for total_compensation are computed on demand and the corresponding rows for each partition selected accordingly. Significantly, this functionality allows a user to base the partitions of a table on an expression, which gives the user more flexibility in defining partitions without having to first create a regular column based on the expression and then storing the regular column on disk.

Although the above example utilizes range partitioning, other partitioning schemes well known in the art, such as list partitioning, hash partitioning, and composite partitioning, may also be employed with virtual columns acting as partitioning keys.

Maintaining Partitions on Virtual Columns

According to one technique, once a table has been partitioned, the partitions may be updated when there are any changes to the base columns that affect values in a virtual column on which the table is partitioned. As discussed above, values in a virtual column are computed from a base expression and may not be stored separately as part of the virtual column. Therefore, when a base column from which values in the virtual column are computed changes, the values in the virtual column change accordingly. For example, when a new row is inserted into a table such that a new value is added to a base column, a corresponding new value is logically added to the virtual column. The actual value that is added to the virtual column depends on the defining expression for the virtual column. According to one technique, the row in the partitioned table which contains the new value in the virtual column is assigned to the appropriate partition based on the new value in the virtual column and the partitioning scheme. In another example, an existing value in a base column is updated, and this updated value is also reflected in an updated value in the virtual column. Again, the actual updated value in the virtual column depends on the defining expression for the virtual column. According to another technique, the row in the partitioned table which contains the updated value in the virtual column may be moved to another partition based on the updated value in the virtual column and the partitioning scheme.

Partition Pruning

Once a table has been partitioned, partition pruning may be performed. Partition pruning is performed by a query optimizer. During partition pruning, the query optimizer analyzes the query statement to determine which partitions are not necessary for the particular query statement. The unnecessary partitions are then eliminated from the query process. After partition pruning is performed, only rows in the partitions which have not been eliminated are searched to satisfy the query. According to one technique, partition pruning is performed on partitions defined by partitioning keys which are virtual columns.

For example, the table employees from the example above is analyzed by the query optimizer with respect to the following query statement.

```
select * from employees
where (total_compensation < 80000)
```

As discussed above, the employees table has been partitioned into four partitions (p1, p2, p3, and p4) based on ranges of values in the total_compensation virtual column. When the query optimizer receives the above query statement, it determines that only partitions p1 and p2 need be searched because partitions p3 and p4 do not contain any rows which satisfy the condition where (total_compensation<80000). Therefore, partitions p3 and p4 are eliminated from the query process and only partitions p1 and p2 are searched.

As this example illustrates, partition pruning significantly increases the performance of queries by dramatically reducing the amount of data that need be retrieved and searched. Therefore, the combination of partition-pruning and partitioning on virtual columns greatly enhances the efficiency of the query executions for data computed from expressions.

According to one technique, partition pruning on a virtual column may be performed for a query which does not explicitly reference the virtual column. For example, the query statement above is replaced with:

```
select * from employees
    where ((salary * (1 + commission_pct)) < 80000)
```

The query optimizer recognizes that (salary*(1+commission_pct)) is the defining expression for the virtual column total_compensation, on which table employees has been partitioned, replaces (salary*(1+commission_pct)) with total_compensation, and performs partition pruning to eliminate partitions p3 and p4. A detailed discussion of expression replacement is contained in U.S. patent application Ser. No. 11/951,918, titled Expression Replacement in Virtual Columns, filed by Subhransu Basu and Harmeek Singh Bedi on Dec. 6, 2007.

Partition-Wise Joins

Partitions are also useful in enhancing the performance efficiency of join operations. In a join operation, rows from two or more tables, views, or snapshots are combined together based on a condition that compares two or more columns, each from a different table, view, or snapshot. Such a condition is called a join condition. When one or more tables involved in a join is partitioned on the same key that appears in the join condition, only the rows in each partition need be compared to each other. These types of joins are referred to as partition-wise joins. Partition-wise joins may be performed when there is a mapping between the partitions of two partitioned objects that are to be joined, where the join key of the join is the partitioning key for the partitioned objects.

Partition-wise joins may be performed serially or in parallel. Parallel partition-wise joins significantly reduce the execution time of join operations. When the same partitioning key is applied to all the tables in a join, a full parallel partition-wise join is performed. Alternatively, a partial parallel partition-wise join may be performed. In a partial parallel partition-wise join, one of the joined objects is (1) unpartitioned, (2) partitioned based on a different key, or (3) partitioned based on the same key but using a different partitioning function than the object with which it is to be joined.

As discussed above, tables may be partitioned where a virtual column is the partitioning key. A virtual column may also be used in a join condition in a join operation. Therefore, partition-wise joins may be performed on tables which have been partitioned on virtual column partition keys, thereby enhancing the efficiency of the query executions for data computed from expressions.

According to one technique, partition-wise joins may be used in conjunction with expression replacement so that partition-wise join may be performed on queries which do no explicitly reference the partitioned virtual column. For example, consider tables t2 and t3.

```
create table t2 (
    c1;
    c2;
    c3 as (c1+c2)
)
create table t3(
    c1;
    c2;
    c3 as (c1−c2)
)
```

Tables t2 and t3 have been partitioned on virtual columns t2.c3 and t3.c3, respectively. A query statement is received.

```
select * from t2, t3
    where ((t2.c1 + t2.c2) = (t3.c2 − t3.c1))
```

The query optimizer recognizes that (t2.c1+t2.c2) is the defining expression for the virtual column t2.c3, on which table t2 been partitioned, and that (t3.c1−t3.c2) is the defining expression for the virtual column t3.c3, on which table t3 been partitioned. Therefore, query optimizer replaces (t2.c1+ t2.c2) with t2.c3, replaces (t3.c1−t3.c2) with t3.c3, and performs partition-wise joins for each of the partitions. As discussed above, a detailed discussion of expression replacement is contained in U.S. patent application Ser. No. 11/951,918, titled Expression Replacement in Virtual Columns, filed by Subhransu Basu and Harmeek Singh Bedi on Dec. 6, 2007.

Hardware Overview

Figure 2:
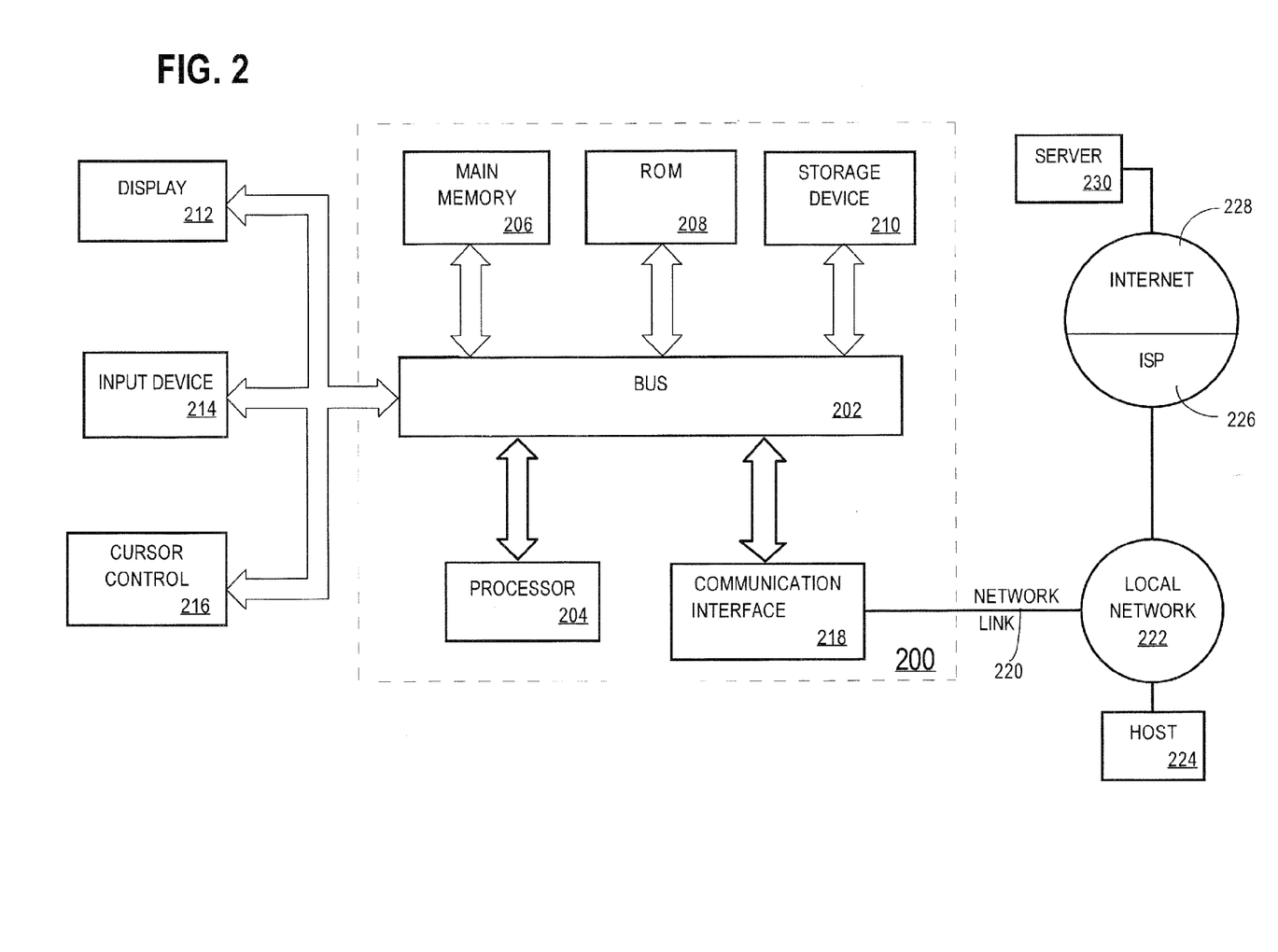
FIG. 2 is a diagram of a computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for partitioning a database object, comprising steps of:
receiving one or more DDL statements that define a virtual column for the database object, said one or more DDL statements specifying:
a name for the virtual column,
a virtual column expression, and
that the database object is to be partitioned based on the virtual column;
generating database metadata that:
defines the virtual column as having said name,
defines the virtual column as representing a result of applying the virtual column expression; and
defines a plurality of partitions for the database object, wherein each individual partition of the plurality of partitions corresponds to a unique subset of values of a plurality of unique subsets of values;
storing one or more records in the database object by, for each record of the one or more records, performing at least:

evaluating the virtual column expression on one or more base columns of the record to obtain a value, and assigning the record to a particular partition of the plurality of partitions based on the value;

receiving a query that references the virtual column;

determining, based on the query and the plurality of unique subsets of values, a set of unnecessary partitions, wherein the set of unnecessary partitions comprises partitions in the plurality of partitions that are not needed for processing the query;

processing the query based on partitions in the plurality of partitions which are not in the set of unnecessary partitions;

wherein the method is performed by one or more computing devices.

2. The computer-implemented method of claim 1, wherein the unique subset of values corresponds to a unique range of values in the virtual column.

3. The computer-implemented method of claim 1, wherein the unique subset of values correspond to values in the virtual column which correspond to a same hash value produced by a hash function.

4. The computer-implemented method of claim 1, wherein the query references the virtual column by specifying the virtual column expression.

5. The computer-implemented method of claim 1, wherein the steps further comprise:

receiving a DML statement that adds one or more values to a base column on which the virtual column is based;

for each value of the one or more values,
adding, to a partition of the plurality of partitions, a particular record in the database object where a value in the virtual column in the particular record corresponds to the each value,
wherein the value in the virtual column is in the unique subset of values that corresponds to the partition of the plurality of partitions.

6. The computer-implemented method of claim 1, wherein the steps further comprise:

receiving a database command that updates one or more values in a base column on which the virtual column is based;

wherein the values in the virtual column are updated in response to updated values in the base column;

for each value in the one or more values,
determining a partition in the plurality of partitions that contains a particular record in the database object where a value in the virtual column in the particular record corresponds to the each value,
determining whether the value in the virtual column is in the unique subset of values that corresponds to the partition in the plurality of partitions,
in response to determining that the value in the virtual column is not in the unique subset of values that corresponds to the partition in the plurality of partitions, moving the particular record in the database object from the partition in the plurality of partitions to a second partition in the plurality of partitions, wherein the value in the virtual column is in the unique subset of values that corresponds to the second partition of the plurality of partitions.

7. A non-transitory computer-readable storage medium storing instructions for partitioning a database object which, when executed by one or more processors, cause the one or more processors to perform steps comprising:

receiving one or more DDL statements that define a virtual column for the database object, said one or more DDL statements specifying:
a name for the virtual column,
a virtual column expression, and
that the database object is to be partitioned based on the virtual column;

generating database metadata that:
defines the virtual column as having said name, and
defines the virtual column as representing a result of applying the virtual column expression; and
defines a plurality of partitions for the database object, wherein each individual partition of the plurality of partitions corresponds to a unique subset of values of a plurality of unique subsets of values;

storing one or more records in the database object by, for each record of the one or more records, performing at least:
evaluating the virtual column expression on one or more base columns of the record to obtain a value, and
assigning the record to a particular partition of the plurality of partitions based on the value;

receiving a query that references the virtual column;

determining, based on the query and the plurality of unique subsets of values, a set of unnecessary partitions, wherein the set of unnecessary partitions comprises partitions in the plurality of partitions that are not needed for processing the query;

processing the query based on partitions in the plurality of partitions which are not in the set of unnecessary partitions.

8. The non-transitory computer-readable storage medium of claim 7, wherein the unique subset of values corresponds to a unique range of values in the virtual column.

9. The non-transitory computer-readable storage medium of claim 7, wherein the unique subset of values correspond to values in the virtual column which correspond to a same hash value produced by a hash function.

10. The non-transitory computer-readable storage medium of claim 7, wherein the query references the virtual column by specifying the virtual column expression.

11. The non-transitory computer-readable storage medium of claim 7, wherein the steps further comprise:

receiving a DML statement that adds one or more values to a base column on which the virtual column is based;

for each value of the one or more values,
adding, to a partition of the plurality of partitions, a particular record in the database object where a value in the virtual column in the particular record corresponds to the each value,
wherein the value in the virtual column is in the unique subset of values that corresponds to the partition of the plurality of partitions.

12. The non-transitory computer-readable storage medium claim 7, wherein the steps further comprise:

receiving a database command that updates one or more values in a base column on which the virtual column is based;

wherein the values in the virtual column are updated in response to updated values in the base column;

for each value in the one or more values,
determining a partition in the plurality of partitions that contains a particular record in the database object where a value in the virtual column in the particular record corresponds to the each value, determining whether the value in the virtual column is in the unique subset of values that corresponds to the partition in the plurality of partitions, in response to determining that the value in the virtual column is not in the unique subset of values that corresponds to the partition in the plurality of partitions, moving the particular record in the database object from the partition in the plurality of partitions to a second partition in the plurality of partitions, wherein the value in the virtual column is in the unique subset of values that corresponds to the second partition of the plurality of partitions.

13. The method of claim 1, wherein the database object is a first database object, and the steps further comprises a step of processing a statement that specifies a join between the first database object and a second database object based on a join key, where the first database object is partitioned based on the join key, the step of processing comprising:

distributing to each slave process of a plurality of slave processes a first subset of data from said first database object and a second subset of data from said second database object, wherein said first and second subsets of data that are distributed to each slave process of the plurality of slave processes are established based on partitioning criteria used to partition said first object, wherein the join key is the virtual column of the first database object, causing each slave process of said plurality of slave processes to perform a join between the first subset of data assigned to the slave process and the second subset of data assigned to the slave process.

14. The non-transitory computer-readable storage medium of claim 7, wherein the database object is a first database object, and the steps further comprise a step of processing a statement that specifies a join between the first database object and a second database object based on a join key, where the first database object is partitioned based on the join key, the step of processing comprising:

distributing to each slave process of a plurality of slave processes a first subset of data from said first database object and a second subset of data from said second database object, wherein said first and second subsets of data that are distributed to each slave process of the plurality of slave processes are established based on partitioning criteria used to partition said first object, wherein the join key is the virtual column of the first database object, causing each slave process of said plurality of slave processes to perform a join between the first subset of data assigned to the slave process and the second subset of data assigned to the slave process.

* * * * *

UNITED STATES PATENT AND TRADEMARK OFFICE
CERTIFICATE OF CORRECTION

PATENT NO.        : 8,620,888 B2                                                  Page 1 of 1
APPLICATION NO.   : 11/951933
DATED             : December 31, 2013
INVENTOR(S)       : Basu et al.

It is certified that error appears in the above-identified patent and that said Letters Patent is hereby corrected as shown below:

In the Claims:

In column 8, line 60, in Claim 1, delete "expression;" and insert -- expression, --, therefor.

In column 10, line 11, in Claim 7, delete "expression;" and insert -- expression, --, therefor.

In column 10, line 56, in Claim 12, delete "medium" and insert -- medium of --, therefor.

Signed and Sealed this
Eighth Day of July, 2014

Michelle K. Lee
*Deputy Director of the United States Patent and Trademark Office*